(12) United States Patent
Ahn et al.

(10) Patent No.: US 10,510,311 B2
(45) Date of Patent: Dec. 17, 2019

(54) PANEL-DRIVING DEVICE AND DISPLAY DEVICE

(71) Applicant: SILICON WORKS CO., LTD., Daejeon (KR)

(72) Inventors: Yong Sung Ahn, Seoul (KR); Jeong Lee, Seongnam-si (KR); Jun Tak Jeon, Seongnam-si (KR)

(73) Assignee: SILICON WORKS CO., LTD., Daejeon (KR)

( * ) Notice: Subject to any disclaimer, the term of this patent is extended or adjusted under 35 U.S.C. 154(b) by 65 days.

(21) Appl. No.: 15/839,589

(22) Filed: Dec. 12, 2017

(65) Prior Publication Data

US 2018/0182333 A1 Jun. 28, 2018

(30) Foreign Application Priority Data

Dec. 23, 2016 (KR) .................. 10-2016-0177407

(51) Int. Cl.
| | | |
|---|---|---|
| G09G 3/36 | (2006.01) | |
| G02F 1/1335 | (2006.01) | |
| G02F 1/1343 | (2006.01) | |
| G02F 1/1333 | (2006.01) | |
| G02F 1/1368 | (2006.01) | |
| G06F 3/041 | (2006.01) | |
| G06F 3/044 | (2006.01) | |
| G02F 1/1362 | (2006.01) | |
| G09G 3/00 | (2006.01) | |

(52) U.S. Cl.
CPC ......... *G09G 3/3655* (2013.01); *G02F 1/1335* (2013.01); *G02F 1/1368* (2013.01); *G02F 1/13338* (2013.01); *G02F 1/134309* (2013.01); *G02F 1/136286* (2013.01); *G06F 3/044* (2013.01); *G06F 3/0412* (2013.01); *G06F 3/0416* (2013.01); *G09G 3/006* (2013.01); *G09G 3/3648* (2013.01); *G09G 2310/0297* (2013.01); *G09G 2330/10* (2013.01); *G09G 2330/12* (2013.01)

(58) Field of Classification Search
CPC .......... G09G 3/3655; G09G 2310/0297; G02F 1/13338; G06F 3/0412; G06F 3/041
See application file for complete search history.

(56) References Cited

U.S. PATENT DOCUMENTS

2016/0357333 A1* 12/2016 Huang .................. G06F 3/044

FOREIGN PATENT DOCUMENTS

| KR | 10-2008-0066308 A | 7/2008 |
|---|---|---|
| KR | 10-2014-0073431 A | 6/2014 |

* cited by examiner

*Primary Examiner* — Kent W Chang
*Assistant Examiner* — Chayce R Bibbee
(74) *Attorney, Agent, or Firm* — Fenwick & West LLP

(57) ABSTRACT

The present disclosure provides a technique for supplying different voltages to a plurality of adjacent electrodes, sensing a voltage formed on each electrode, and diagnosing a short-circuit failure of each electrode.

14 Claims, 17 Drawing Sheets

FIG.8

\* Data = Voltage (V)

|  | MUX1 | MUX2 | MUX3 | MUX4 |
|---|---|---|---|---|
| CH1 | 5 | 5 | 5 | 5 |
| CH2 | 0 | 0 | 0 | 0 |
| CH3 | 2.5 | 2.5 | 2.5 | 2.5 |
| CH4 | 2.5 | 2.5 | 2.5 | 2.5 |

\* Data = ADC Code

|  | MUX1 | MUX2 | MUX3 | MUX4 |
|---|---|---|---|---|
| CH1 | 2048 | 2048 | 2048 | 2048 |
| CH2 | 0 | 0 | 0 | 0 |
| CH3 | 1024 | 1024 | 1024 | 1024 |
| CH4 | 1024 | 1024 | 1024 | 1024 |

FIG.10

\* Data = Voltage (V)

|     | MUX1 | MUX2 | MUX3 | MUX4 |
|-----|------|------|------|------|
| CH1 | 5    | 0    | 5    | 0    |
| CH2 | 5    | 0    | 5    | 0    |
| CH3 | 5    | 0    | 5    | 0    |
| CH4 | 2.5  | 2.5  | 2.5  | 2.5  |

\* Data = ADC Code

|     | MUX1 | MUX2 | MUX3 | MUX4 |
|-----|------|------|------|------|
| CH1 | 2048 | 0    | 2048 | 0    |
| CH2 | 2048 | 0    | 2048 | 0    |
| CH3 | 2048 | 0    | 2048 | 0    |
| CH4 | 1024 | 1024 | 1024 | 1024 |

FIG.16

DATA A

\* Data = ADC Code

|     | MUX1 | MUX2 | MUX3 | MUX4 |
|-----|------|------|------|------|
| CH1 | 1024 | 1024 | 1024 | 1024 |
| CH2 | 1024 | 1024 | 1024 | 1024 |
| CH3 | 1024 | 1024 | 1024 | 1024 |
| CH4 | 1024 | 1024 | 1024 | 1024 |

DATA B

\* Data = ADC Code

|     | MUX1 | MUX2 | MUX3 | MUX4 |
|-----|------|------|------|------|
| CH1 | 2048 | 2048 | 2048 | 2048 |
| CH2 | 2048 | 2048 | *1024* | 2048 |
| CH3 | 2048 | 2048 | 2048 | 2048 |
| CH4 | 2048 | 2048 | 2048 | 2048 |

# PANEL-DRIVING DEVICE AND DISPLAY DEVICE

CROSS REFERENCE TO RELATED APPLICATION

This application claims priority from Korean Patent Application No. 10-2016-0177407, filed on Dec. 23, 2016, which is hereby incorporated by reference for all purposes as if fully set forth herein.

BACKGROUND OF THE INVENTION

1. Field of the Invention

An embodiment relates to a panel-driving technique and a display device.

2. Description of the Prior Art

On a panel, a plurality of pixels may be defined, and various electrodes, such as gate lines and data lines for driving the pixels, may be disposed.

Meanwhile, the distance between the electrodes disposed on the panel is decreasing in order to implement high resolution. However, when the distance between the electrodes decreases, the probability of occurrence of a short-circuit failure between the electrodes increases.

When a short-circuit failure occurs between the electrodes, various problems may be caused in the panel.

In the case of electrodes used for driving pixels, such as gate lines or data lines, a short-circuit failure between the electrodes may cause a problem of deterioration of image quality. For example, when two adjacent gate lines are short-circuited, a lighting defect, by which an undesired pixel is driven, may be generated. As another example, when two adjacent data lines are short-circuited, a problem may occur in that pixels are driven with undesired brightness in accordance with the drop or rise in the data voltage.

In the case where electrodes are common voltage electrodes and the common voltage electrodes are commonly used as touch electrodes, a short-circuit failure between the electrodes may cause a problem of decreased touch sensitivity or a problem in which a touch is not sensed at the corresponding electrodes.

Besides the short-circuit failure, an open-circuit failure of electrodes may also cause similar problems in the panel.

For example, when an open-circuit failure occurs in a line connected to a gate line, a Line Defect (LD), by which all of a series of pixels connected to the corresponding gate line are not turned on, may be caused. As another example, when an open-circuit failure occurs in a line connected to a touch electrode, a problem may occur in that a touch may not be sensed at the corresponding electrode.

In order to prevent or solve such a problem, the development of a technique for detecting a short-circuit failure and an open-circuit failure between electrodes is required.

SUMMARY OF THE INVENTION

Against this background, in one aspect, embodiments provide a technique for detecting a short-circuit failure of electrodes disposed on a panel.

In another aspect, embodiments provide a technique for detecting an open-circuit failure of electrodes disposed on a panel.

In another aspect, embodiments provide a technique capable of detecting both a short-circuit failure and an open-circuit failure of electrodes disposed on a panel.

In another aspect, embodiments provide a technique for detecting a short-circuit failure or an open-circuit failure of electrodes disposed on a panel using a touch-sensing circuit.

In order to achieve the above-described objects, one embodiment provides a panel-driving device including: a plurality of channel circuits each including a driving unit configured to supply a common voltage to an electrode in a display-driving period and to supply a driving signal, which varies at a plurality of voltage levels, to the electrodes in a touch-driving period, and a sensing unit configured to sense a touch or proximity of an external object to a panel according to a response signal formed on the electrode in response to the driving signal. The driving unit included in a first channel circuit supplies a first voltage having a first voltage level, among the plurality of voltage levels, to a first electrode, the driving unit included in a second channel circuit supplies a second voltage having a second voltage level, which differs from the first voltage level, among the plurality of voltage levels to a second electrode disposed adjacent to the first electrode, and the sensing unit included in the first channel circuit diagonoses a short-circuit failure of the first electrode according to a voltage level of a voltage (sensed voltage) formed on the first electrode.

Another embodiment provides a display device including: a panel including a plurality of pixels disposed thereon and a plurality of common voltage electrodes thereon so as to transmit a common voltage to the pixels; a first driving unit configured to supply a first voltage having a first voltage level to a common voltage electrode; a second driving unit configured to supply a second voltage having a second voltage level, which differs from the first voltage level, to the common voltage electrode; and a sensing unit. The sensing unit is configured to: sense a touch or proximity of an external object to the panel according to a response signal formed on the common voltage electrode in a touch-sensing period in which the first voltage and the second voltage are alternately supplied; and, in a time period in which the first voltage is supplied to a first common voltage electrode and the second voltage is supplied to a second common voltage electrode adjacent to the first common voltage electrode, determine that a short-circuit failure has occurred in the first common voltage electrode when a voltage (sensed voltage) formed in the first common voltage electrode indicates a voltage level between the first voltage level and the second voltage level.

Still another embodiment provides a panel-driving device including: a driving unit configured to supply a driving signal to an electrode disposed on the panel; and a sensing unit configured to sensing a touch or proximity of an external object with respect to the panel according to a response signal formed on the electrode in response to the driving signal, and to diagonose an open-circuit failure of a line connected to the electrode according to the response signal.

According to the embodiments described above, it is possible to detect a short-circuit failure of electrodes disposed on a panel. According to the embodiments, it is possible to detect an open-circuit failure of electrodes disposed on a panel. According to the embodiments, it is possible to detect both a short-circuit failure and an open-circuit failure of electrodes disposed on a panel. Further, according to the embodiments, it is possible to detect both a short-circuit failure and an open-circuit failure of electrodes disposed on a panel using a touch-sensing circuit.

BRIEF DESCRIPTION OF THE DRAWINGS

The above and other aspects, features and advantages of the present disclosure will be more apparent from the following detailed description taken in conjunction with the accompanying drawings, in which:

FIG. 8 is a diagram for explaining an example in which voltages of different voltage levels are supplied to odd-numbered rows and even-numbered rows, respectively;

FIG. 10 is a diagram for explaining an example in which voltages of different voltage levels are supplied to odd-numbered columns and even-numbered columns, respectively;

FIG. 16 is a diagram representing sensed values in a first driving condition and a second condition in still another embodiment.

DETAILED DESCRIPTION OF THE EXEMPLARY EMBODIMENTS

Figure 1:
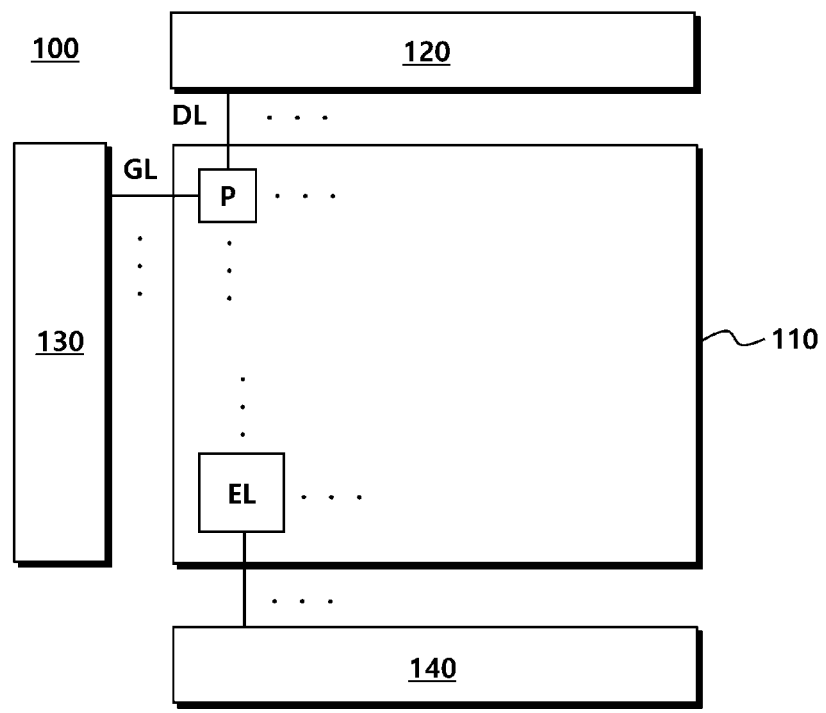
FIG. 1 is a configuration diagram of a display device according to one embodiment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a configuration diagram of a display device according to an embodiment.

Referring to FIG. 1, a display device 100 includes a panel 110, a data-driving circuit 120, a gate-driving circuit 130, an electrode-driving circuit 140, and the like.

Each of the data-driving circuit 120, the gate-driving circuit 130, and the electrode-driving circuit 140 may drive at least one configuration included in the panel 110.

The data-driving circuit 120 may drive a data line DL connected to a pixel P and the gate-driving circuit 130 may drive a gate line GL connected to the pixel P. In addition, the electrode-driving circuit 140 may drive an electrode EL disposed on the panel 110.

The devices 120, 130, and 140 for driving at least one configuration included in the panel 110 may be referred to as panel-driving devices.

Each of the panel-driving devices may constitute one Integrated Circuit (IC). For example, the data-driving circuit 120 may constitute a data driver IC, and the gate-driving circuit 130 may constitute a gate driver IC.

In the panel-driving device, two or more circuits may constitute one IC. For example, the data-driving circuit 120 and the electrode-driving circuit 140 may constitute one integrated display-driving IC.

In addition to the above-described data-driving circuit 120, the gate-driving circuit 130, and the electrode-driving circuit 140, the panel-driving device may have a touch-driving circuit, a timing controller, a power management circuit, and the like.

Even though the names are different, two panel-driving devices may be constituted as a single piece of hardware. For example, the electrode-driving circuit 140 and the touch-driving circuit may be configured with the same hardware.

Each of the circuits 120, 130, and 140 described above may be referred to as a panel-driving device, or all of the circuits 120, 130, and 140 may be referred to as a panel-driving device as a whole.

Meanwhile, the data-driving circuit 120 may supply a data voltage to the data line DL in order to display a digital image on each pixel P of the panel 110.

The data-driving circuit 120 may include at least one data driver IC, which may be connected to a bonding pad of the panel 110 in a Tape-Automated-Bonding (TAB) manner or a Chip-On-Glass (COG) manner, or may be directly formed on the panel 110. In some cases, the data driver IC may be formed by being integrated on the panel 110. In addition, the data-driving circuit 120 may also be implemented in a Chip-On-Film (COF) manner.

The gate-driving circuit 130 may sequentially supply a scan signal to the gate line GL so as to turn on or turn off a transistor located in each pixel P.

As illustrated in FIG. 1, the gate-driving circuit 130 may be located on one side of the panel 110, or may be divided into two parts so as to be located on opposite sides of the panel 110.

The gate-driving circuit 130 may also include at least one gate driver IC, which may be connected to a bonding pad of the panel 110 in a TAB manner or a COG manner, or may be directly formed on the panel 110 by being implemented in a Gate-In-Panel (GIP) type. In some cases, the gate driver IC may be formed by being integrated on the panel 110. In addition, the gate-driving circuit 130 may also be implemented in a COF manner.

The panel 110 may include only a display panel, or may further include a touch panel (Touch Screen Panel (TSP)). Here, the display panel and the touch panel can share some components with each other. For example, the touch electrode for sensing a touch on the touch panel may be a common voltage electrode to which a common voltage is supplied from the display panel. In view of the fact that some components of the display panel and the touch panel are shared with each other, this panel 110 is also referral to as an integral-type panel. However, the present disclosure is not limited thereto. In addition, although an in-cell-type panel is known as a type in which some components of the display panel and the touch panel are shared with each other, this is merely an example of the above-mentioned panel 110, and a panel to which the present disclosure is applied is not limited to the in-cell-type panel.

Meanwhile, a plurality of electrodes EL are disposed on the panel 110, and the electrode-driving circuit 140 is capable of driving the electrodes EL using a drive signal. Using the drive signal, the electrode drive circuit 140 may detect both a short-circuit failure of the electrodes EL and an open-circuit failure of the electrode EL.

Here, each of the electrodes EL may be understood as a plate having a predetermined area and conducting electricity. Each electrode EL may be, for example, a gate line GL or a data line DL disposed on the panel 110. The technique for driving the electrodes EL described below is also applicable to the gate line GL or the data line DL.

The electrode EL may be a common voltage electrode to which a common voltage is supplied.

Figure 2:
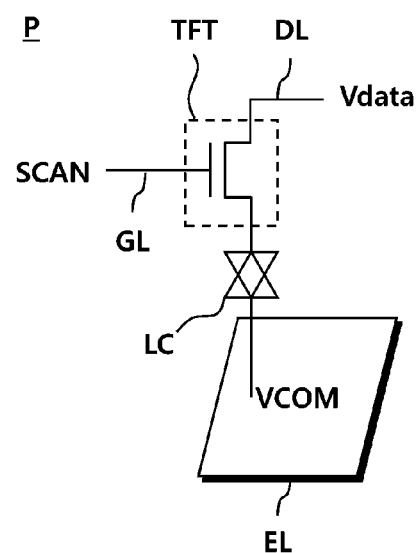
FIG. 2 is an internal configuration diagram of a pixel in the case where an electrode according to one embodiment is a common voltage electrode.

FIG. 2 is an internal configuration diagram of a pixel in the case where an electrode according to one embodiment is a common voltage electrode.

Referring to FIG. 2, the pixel P may include a transistor TFT, a liquid crystal LC, and a common voltage electrode VCOM.

The gate terminal of the transistor TFT may be connected to the gate line GL, the drain terminal may be connected to the data line DL, and the source terminal may be connected in the liquid crystal LC direction.

When a scan signal SCAN corresponding to the turn-on voltage is supplied to the gate terminal through the gate line GL, the drain terminal and the source terminal of the transistor TFT are conductively connected with each other, and the data voltage Vdata may be supplied in the liquid crystal LC direction.

A common voltage may be supplied to the common voltage electrode VCOM, and the brightness of the pixel P may be adjusted while the liquid crystal LC is controlled according to the common voltage and the data voltage Vdata.

Meanwhile, the common voltage electrode VCOM may be an electrode EL, which is driven by the electrode-driving circuit (see 140 in FIG. 1) described with reference to FIG. 1. The electrode-driving circuit (see 140 in FIG. 1) is able to detect a short-circuit failure and/or an open-circuit failure of the common voltage electrode VCOM using a drive signal.

The electrode EL may be a touch electrode that senses a touch or proximity of an external object.

Figure 3:
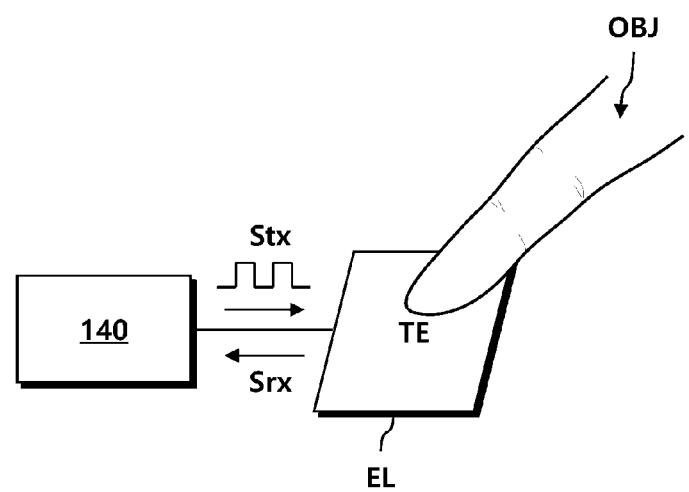
FIG. 3 is a diagram illustrating an example of a case where the electrode according to one embodiment is a touch electrode.

FIG. 3 is a diagram illustrating an example of a case where the electrode according to one embodiment is a touch electrode.

The touch electrode TB may be an electrode EL, which is driven by the electrode-driving circuit 140 described above with reference to FIG. 1. The electrode-driving circuit 140 is able to detect a short-circuit failure and/or an open-circuit failure of the touch electrodes 1B using a drive signal.

The electrode-driving circuit 140 may function as a touch-driving circuit, which drives the touch electrode TB using a touch-driving signal Stx and senses a touch or proximity of an object OBJ with respect to the panel according to a response signal, which is formed on the touch electrode TE in response to the touch-driving signal Stx.

Here, the electrode-driving circuit 140 may be an electrostatic capacitive touch type, which recognizes the proximity or a touch of an object OBJ by detecting an electrostatic capacitance or a change in the electrostatic capacitance in the touch electrode TB.

Such an electrostatic capacitive touch type may be divided into, for example, a mutual electrostatic capacitive touch type and a self-electrostatic capacitive touch type.

In the mutual electrostatic capacitive touch type, which is one type of the electrostatic touch type, a touch-driving signal Stx is applied to one touch electrode and another touch electrode, which is mutually coupled to the one touch electrode, is sensed. In the mutual electrostatic capacitive touch type, a value sensed by another touch electrode differs depending on the touch or proximity of an object OBJ, such as a finger or a pen, and in the mutual electrostatic capacitive touch type, the presence/absence of a touch, a touch coordinate, and the like are detected using such a sensed value.

In the self-electrostatic capacitive touch type, which is another type of the electrostatic touch type, a touch-driving signal Stx is applied to one touch electrode and then the corresponding touch electrode is sensed again. In the self-electrostatic capacitive touch type, a value sensed by the touch electrode differs depending on the touch or proximity of an object OBJ, such as a finger or a pen, and in the self-electrostatic capacitive touch type, the presence/absence of a touch, touch coordinates, and the like are detected using such a sensed value. In the self-electrostatic capacitance touch type, the touch electrode for applying the touch-driving signal Stx and the touch electrode for sensing are the same.

One embodiment may be applied to the mutual electrostatic capacitive touch type, and may also be applied to the self-electrostatic capacitance touch type. In some examples below, for the convenience of explanation, descriptions will be made of a case where one embodiment is applied to a self-electrostatic capacitance touch type.

Figure 4:
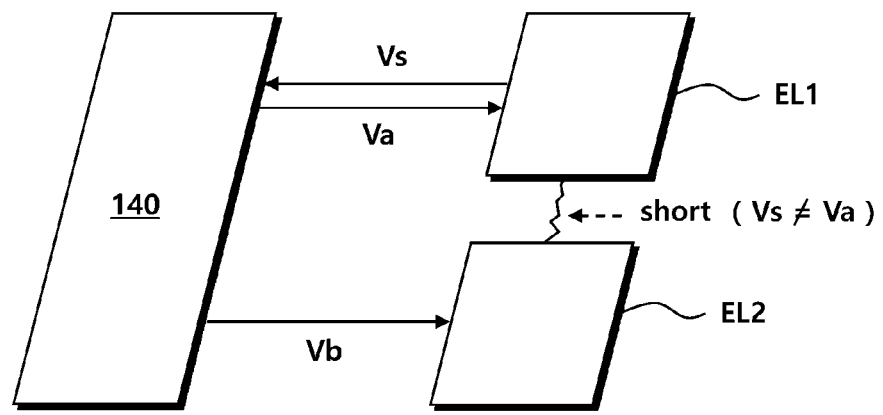
FIG. 4 is a diagram for explaining a process of detecting an electrode short-circuit by an electrode-driving circuit according to one embodiment.

FIG. 4 is a diagram for explaining a process of detecting an electrode short-circuit by an electrode-driving circuit according to one embodiment.

Referring to FIG. 4, the electrode-driving circuit 140 may supply a first voltage Va having a first voltage level to a first electrode EL1. In addition, the electrode-driving circuit 140 may supply a second voltage Vb having a second voltage level, which differs from the first voltage level, to a second electrode EL2 disposed adjacent to the first electrode EL1. In addition, the electrode-driving circuit 140 is able to diagnose the short-circuit failure of the first electrode EL1 according to the voltage level of the voltage (the sensed voltage Vs) formed on the first electrode EL1.

When the first electrode EL1 is not short-circuited, since the first electrode EL1 is in a floating state, the voltage Va supplied to the first electrode EL1 and the voltage Vs formed on the first electrode EL1 become equal to each other. When the sensed voltage Vs for the first electrode EL1 is substantially equal to the first voltage Va, the electrode-driving circuit 140 may determine that the first electrode EL1 is normal.

Conversely, when the first electrode EL1 is short-circuited with the second electrode EL2, the voltage Va supplied to the first electrode EL1 and the voltage Vs formed on the first electrode EL1 become different from each other. When a short circuit occurs in the first electrode EL1, the sensed voltage Vs formed in the first electrode EL1 may indicate a voltage level between the first voltage Va and the second voltage Vb. Accordingly, when the sensed voltage Vs and the first voltage Va are different from each other, the electrode-driving circuit 140 may determine that a short-circuit failure has occurred in the first electrode EL1. Alternatively, when the sensed voltage Vs indicates the voltage level between thoses of the first voltage Va and the second voltage Vb, the electrode-driving circuit 140 may determine that a short-circuit failure has occurred in the first electrode EL1.

The first voltage Va and the second voltage Vb may be constant DC voltage. The first voltage Va may be a direct current high voltage and the second voltage Vb may be a direct current low voltage. In contrast, the first voltage Va may be a direct current low voltage and the second voltage Vb may be a direct current high voltage.

Figure 5:
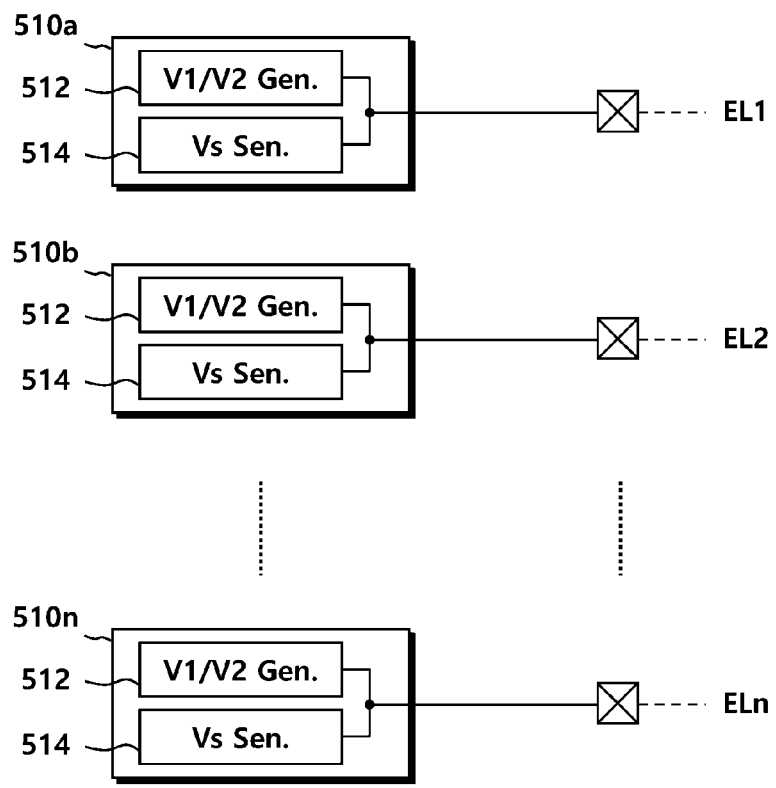
FIG. 5 is a configuration diagram of an example of an electrode-driving circuit according to one embodiment.

FIG. 5 is a configuration diagram of an example of an electrode-driving circuit according to one embodiment.

Referring to FIG. 5, the electrode-driving circuit 140 may include a plurality of channel circuits 510a, 510b, ..., and 510n, which are connected to output terminals, respectively. In addition, the electrodes EL1, EL2, ..., and ELn may be connected to the output terminals, respectively.

Each of the channel circuits 510a, 510b, ..., and 510n may include a driving unit 512 and a sensing unit 514.

The driving unit 512 generates a driving signal, which varies at a plurality of voltage levels, and may supply the driving signal to the electrodes EL1, EL2, ..., and ELn, which are disposed in the panel.

The driving signal may have, for example, a waveform of a square wave. At this time, the square wave may vary at two voltage levels of a high-voltage level and a low-voltage level. The driving signal may vary at three or more voltage levels. For example, the driving signal may vary at a positive high-voltage level, a zero-voltage level, and a negative low-voltage level.

The driving unit 512 is able to select and output one of the plurality of voltage levels. For example, the driving unit 512 may output a driving signal, which varies at the first voltage level and the second voltage level, or may output only a voltage at the first voltage level. In addition, the driving unit 512 may output only a voltage at the second voltage level.

When performing a function other than short-circuit detection, the driving unit 512 outputs a driving signal that varies at a plurality of voltage levels. When detecting a short-circuit, the driving unit 512 outputs one of a plurality of voltage levels (e.g., a voltage of a first voltage level or a second voltage level).

More specifically, when the electrodes EL1, EL2, ..., and ELn are touch electrodes, and the driving unit 512 drives the touch electrodes using a driving signal, which varies at a plurality of voltage levels, in the touch-driving period, the driving unit 512 may supply a driving signal, which varies at the plurality of voltage levels, to the electrodes EL1, EL2, ..., and ELn, and in the short-circuit detection period, the driving unit 512 may output a voltage of the first voltage level or a voltage of the second voltage level to the electrodes EL1, EL2, ..., and ELn.

As another example, when the electrodes EL1, EL2, ..., and ELn are touch electrodes and common voltage electrodes, the driving unit 512 may supply a driving signal, which varies at a plurality of voltage levels, to the electrodes EL1, EL2, ..., and ELn. In addition, in the display-driving period, the driving unit 512 may supply a common voltage for driving the pixels arranged on the panel to the electrodes EL1, EL2, ..., and ELn. In addition, in the short-circuit detection period, the driving unit 512 may output a voltage of the first voltage level, the second voltage level, or the common voltage level to the electrodes EL1, EL2, ..., and ELn.

The sensing unit 514 may sense a response signal formed on each of the electrodes EL1, EL2, ..., and ELn in response to a driving signal supplied to each of the electrodes EL1, EL2, ..., and ELn. Then, the sensing unit 514 may sense a change in each of the electrodes EL1, EL2, ..., and ELn according to such a response signal. For example, when the electrodes EL1, EL2, ..., ELn are used as touch electrodes, the sensing unit 514 is able to sense a touch or proximity of an object with respect to the panel according to a response signal formed on each of the electrodes EL1, EL2, ..., and ELn.

In the touch-driving period, the sensing unit 514 is able to sense a touch or proximity of an object with respect to the panel, and in the short-circuit detection period, the sensing unit 514 is able to detect a short-circuit of the electrodes EL1, EL2, ..., and ELn.

In the short-circuit detection period, the voltage levels output to the respective electrodes EL1, EL2, ..., and ELn may be different from each other.

For example, the driving unit 512 included in the first channel circuit 510a may supply a voltage of the first voltage level to the first electrode EL1. In addition, the second channel circuit 510b may supply a voltage of a second voltage level, which differs from the first voltage level, to the second electrode EL2 disposed adjacent to the first electrode EL1.

In addition, the sensing unit 514 included in the first channel circuit 510a may diagnose a short-circuit failure of the first electrode EL1 according to the voltage level of the voltage formed on the first electrode EL1. The sensing unit 514 of the first channel circuit 510a may determine that a short-circuit failure has occurred in the first electrode EL1 when the voltage formed on the first electrode EL1 indicates a voltage level between the first voltage level and the second voltage level. Alternatively, the sensing unit 514 of the first channel circuit 510a may determine that a short-circuit failure has occurred on the first electrode EL1 when the voltage formed in the first electrode EL1 is different from the first voltage level by a predetermined voltage or more.

The sensing unit 514 included in the second channel circuit 510b may diagnose a short-circuit failure of the second electrode EL2 according to the voltage level of the voltage formed on the second electrode EL2. The sensing unit 514 of the second channel circuit 510b may determine that a short-circuit failure has occurred in the second electrode EL2 when the voltage formed on the second electrode EL2 indicates a voltage level between the first voltage level and the second voltage level.

The first channel circuit 510a and the second channel circuit 510b may output a voltage while changing the levels of the voltage depending on short-circuit detection periods. For example, in a first short-circuit detection period, the driving unit 512 of the first channel circuit 510a may output the voltage of the first voltage level, and the driving unit 512 of the second channel circuit 510b may output the voltage of the second voltage level. In addition, in a second short-circuit detection period, the driving unit 512 of the first channel circuit 510a may output the voltage of the second voltage level, and the driving unit 512 of the second channel circuit 510b may output the voltage of the first voltage level. In the first short detection period, the sensing unit 514 of the first channel circuit 510a diagnoses a short-circuit failure of the first electrode EL1. In the second short detection period, the sensing portion 514 of the second channel circuit 510b may diagnose the short-circuit failure of the second electrode EL2.

Meanwhile, one channel circuit may be connected to a plurality of electrodes using a mux circuit.

Figure 6:
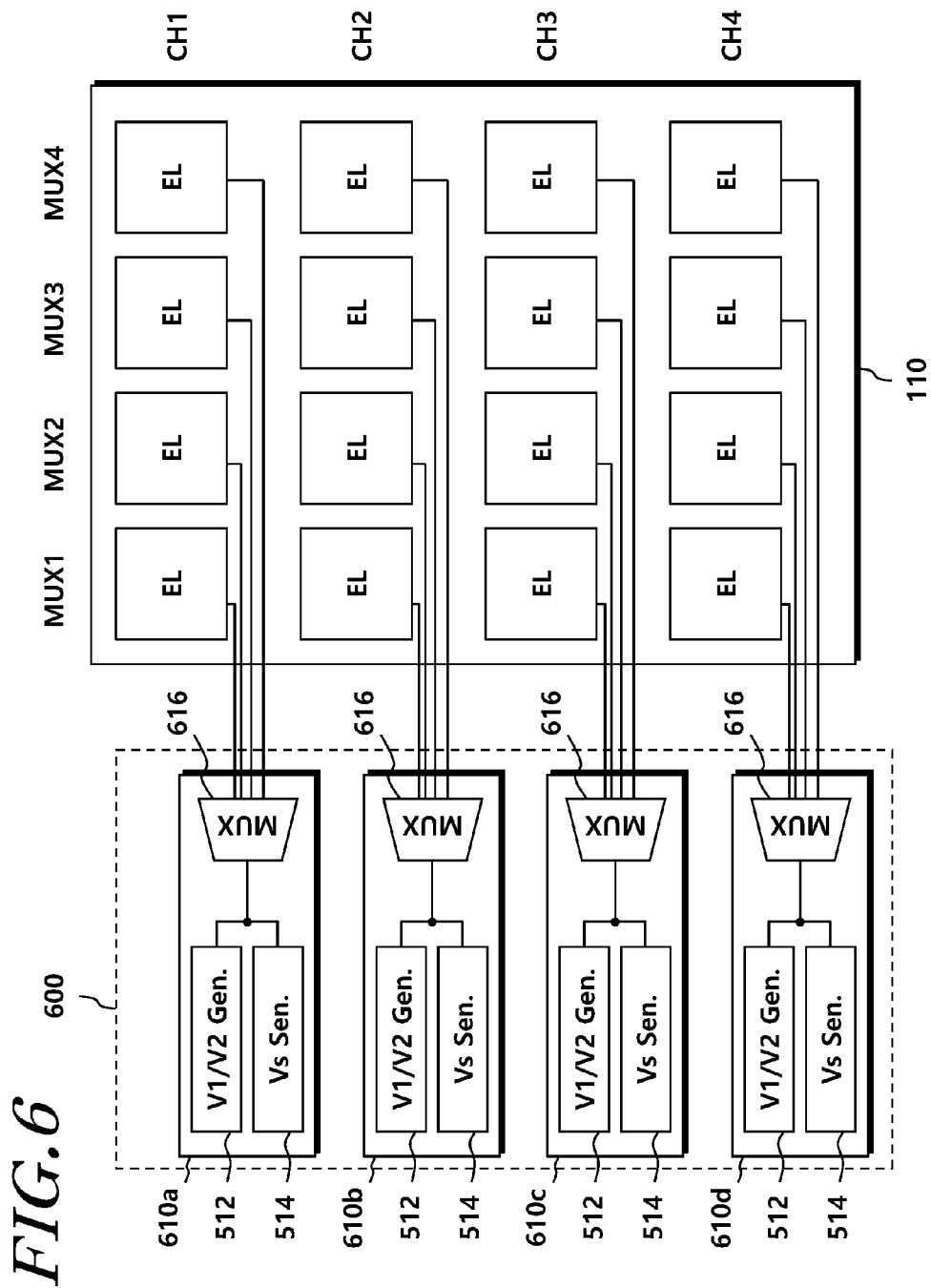
FIG. 6 is a configuration diagram of another example of the electrode-driving circuit according to one embodiment.

FIG. 6 is a configuration diagram of another example of the electrode-driving circuit according to one embodiment.

Referring to FIG. 6, the electrode-driving circuit 600 may include a plurality of channel circuits 610a, 610b, 610c, and 610d.

Each of the channel circuits 610a, 610b, 610c, and 610d may include a driving unit 512, a sensing unit 514, and a mux unit 616.

The driving unit 512 may generate a driving signal, which varies at a plurality of voltage levels, and may supply the driving signal to the electrodes EL disposed on the panel.

The sensing unit 514 may sense a response signal formed on each of the electrodes EL in response to the driving signal supplied to each of the electrodes EL.

The mux unit 616 receives the driving signal from the driving unit 512 and may selectively output the driving signal to at least one of the plurality of output terminals. The output terminals are connected to the electrodes EL, and the mux unit 616 may receive a response signal from the electrodes EL, from which the driving signal is output, and may transmit the response signal to the sensing unit 514.

The mux unit 616 may be connected to one row (or one column) of electrodes EL arranged in one direction (e.g., the horizontal direction) of the panel 110. Using such a mux unit 616, the electrode-driving circuit 600 may supply a first voltage to a plurality of electrodes arranged in a first column and may supply a second voltage to a plurality of electrodes arranged in a second column adjacent to the first column. In addition, the electrode-driving circuit 600 is able to diagnose a short-circuit failure with respect to the electrodes in the first column in accordance with the voltages formed on the plurality of electrodes arranged in the first column.

Figure 7:
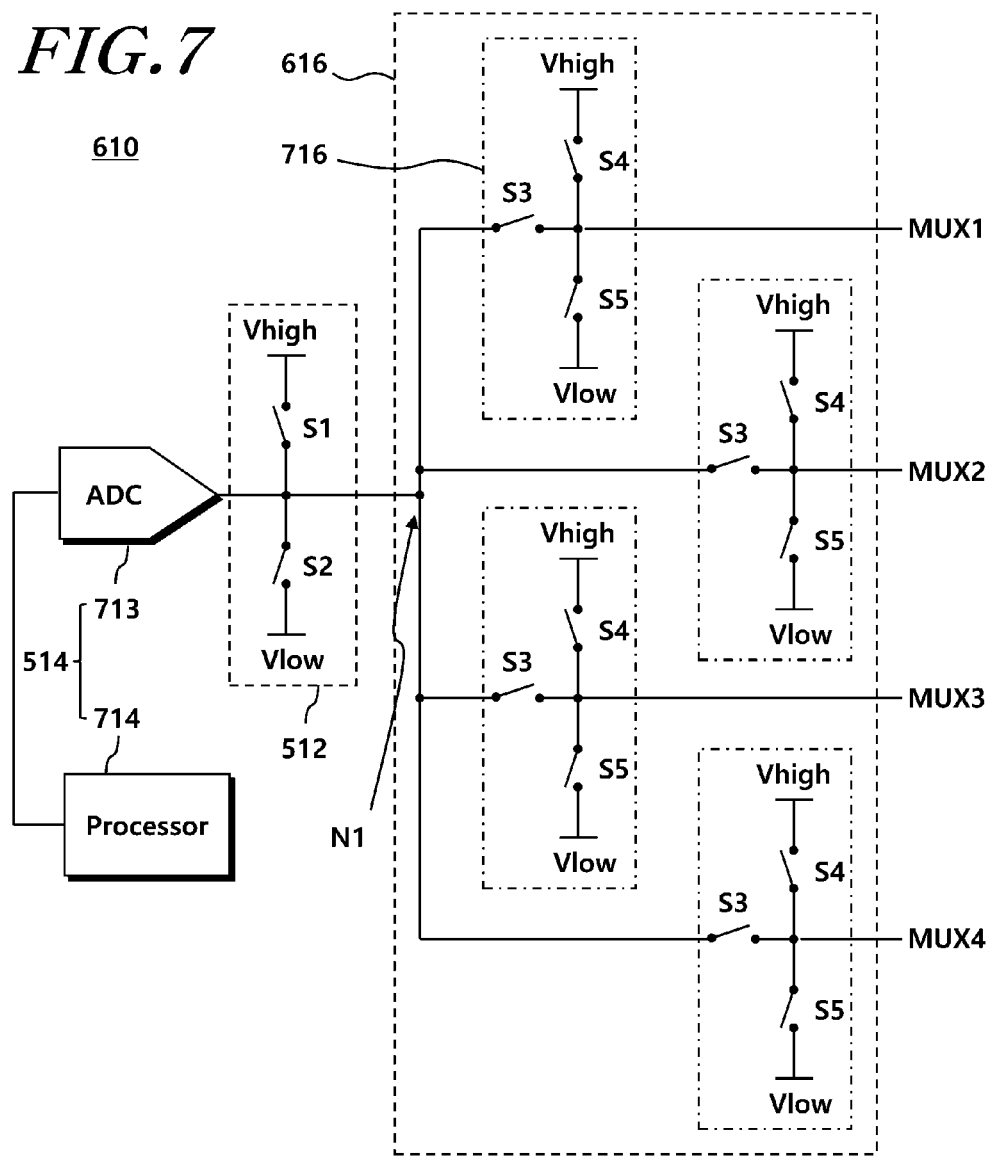
FIG. 7 is a configuration diagram of an example of a channel circuit in FIG. 6.

FIG. 7 is a configuration diagram of an example of a channel circuit in FIG. 6.

Referring to FIG. 7, the mux unit 616 may include a plurality of auxiliary driving units 716 connected to respective output terminals MUX1, MUX2, MUX3, and MUX4.

The driving unit 512 may output a voltage of a first voltage level (a first voltage) to a third electrode through one output terminal among the plurality of output terminals MUX1, MUX2, MUX3, and MUX4, and each auxiliary driving unit 716 may output a voltage of the third voltage level (a third voltage) to a fourth electrode through another output terminal.

In addition, the sensing unit 514 may sense a voltage formed at the third electrode so as to diagnose a short-circuit failure between the third electrode and the fourth electrode.

The driving unit 512 and the auxiliary driving unit 716 may include a plurality of switches.

The driving unit 512 may include a first switch S1 for electrically connecting a high-voltage source Vhigh to a first node N1 and a second switch S2 for electrically connecting a low-voltage source Vlow to the first node N1. When the first switch S1 is turned on and the second switch S2 is turned off, a voltage Vhigh of a high-voltage level may be output to the first node N1, and when the first switch S1 is turned off and the second switch S2 is turned on, the voltage Vlow of a low-voltage level may be output to the first node N1. In addition, the voltage output to the first node N1 may be output to one of the plurality of output terminals MUX1, MUX2, MUX3, and MUX4 while one of the third switches S3 included in the plurality of auxiliary driving units 716 is turned on.

The auxiliary driving units 716 may include third switches S3 for connecting the first node N1 and the output terminals MUX1, MUX2, MUX3, and MUX4, a fourth switch S4 for electrically connecting the high-voltage source Vhigh and the output terminal MUX1, MUX2, MUX3, and MUX3, and fifth switches S5 for electrically connecting the low-voltage source Vlow and the output terminals MUX1, MUX2, MUX3, and MUX4.

When the third switch S3 included in one of the plurality of auxiliary driving units 716 is turned on, an output terminal MUX1, MUX2, MUX3, or MUX4 connected to the corresponding auxiliary driving unit 716 may be connected to the first node N1. At this time, the third switches S3 included in the remaining auxiliary driving units 716 may be turned off.

Using such auxiliary driving units 716, the channel circuit 610 is able to diagnose a short-circuit failure of a plurality of output terminals MUX1, MUX2, MUX3, and MUX4 connected to one mux unit 616.

For example, the driving unit 512 may output the first voltage to the first electrode through the first output terminal MUX1, the auxiliary driving unit 716 may output the second voltage to the second electrode through the second output terminal MUX2, and the sensing unit 514 may diagnose a short-circuit failure of the first electrode or the second electrode according to the voltage formed on the first electrode.

The sensing unit 514 may include an analog-to-digital converter 713 and a digital processor 714. The analog-to-digital converter 713 may convert the voltage formed on the electrode into a digital signal, and may transmit the digital signal to the digital processor 714. Then, the digital processor 714 may diagnose the short-circuit failure of the electrode according to the digital signal.

Meanwhile, the analog-to-digital converter 713 and the digital processor 714 may perform other functions. For example, the analog-to-digital converter 713 may generate a sensed value (demodulated value) corresponding to the electrostatic capacitance of an electrode according to a response signal formed on the electrode as a digital value. In addition, the digital processor 714 may sense a touch or proximity of an object with respect to the panel using such a digital signal. The digital processor 714 may diagnose an open-circuit failure of a line connected to an electrode according to this sensed value (digital signal). When an open-circuit failure occurs in a line connected to an electrode, the electrostatic capacitance is sensed as being small. The digital processor 714 may diagnose the open-circuit failure of the line connected to the electrode using this principle.

On the other hand, the electrode-driving circuit may diagnose the short-circuit failure of the electrodes on a row-by-row basis by supplying voltages of different voltage levels to the odd-numbered rows and the even-numbered rows on a row-by-row basis.

FIG. 8 is a diagram for explaining an example in which voltages of different voltage levels are supplied to odd-numbered rows and even-numbered rows, respectively.

Referring to FIG. 8, in the first short-circuit detection period, the electrode-driving circuit may supply a high voltage (5V) to a plurality of electrodes arranged in the odd-numbered rows CH1 and CH3 and a low voltage (0V) to a plurality of electrodes arranged in even-numbered rows CH2 and CH4. At this time, in order to supply the same voltage for each row, all of the third switches S3 of the plurality of auxiliary driving units 716 described above with reference to FIG. 7 may be turned on at the same time.

On the other hand, a voltage (e.g., 2.5V) between the high voltage (5V) and the low voltage (0V) may be formed on short-circuited electrodes (the electrodes of the third row CH3 and the fourth row CH4 in the example of FIG. 8). The electrode-driving circuit may diagnose a short-circuit failure of the electrodes by sensing such a voltage formed on the electrodes.

The electrode-driving circuit may diagnose a short-circuit failure of the electrodes after converting a voltage formed on the electrodes into a digital value using an analog-to-digital converter and a digital processor. For example, on the electrodes on which no short-circuit failure has occurred, a digital code (e.g., 2048) corresponding to the high voltage may be generated, or a digital code (e.g., 0) corresponding to the low voltage may be generated. On the other hand, a digital code (e.g., 1024) corresponding to a voltage between the high voltage and the low voltage may be generated on the electrodes where a short-circuit failure has occurred. The electrode-driving circuit may diagnose a short-circuit failure of each electrode using the digital code for each electrode.

As illustrated in FIG. 8, although the electrode-driving circuit may simultaneously check even-numbered rows and odd-numbered rows, respective rows may be sequentially checked.

Figure 9:
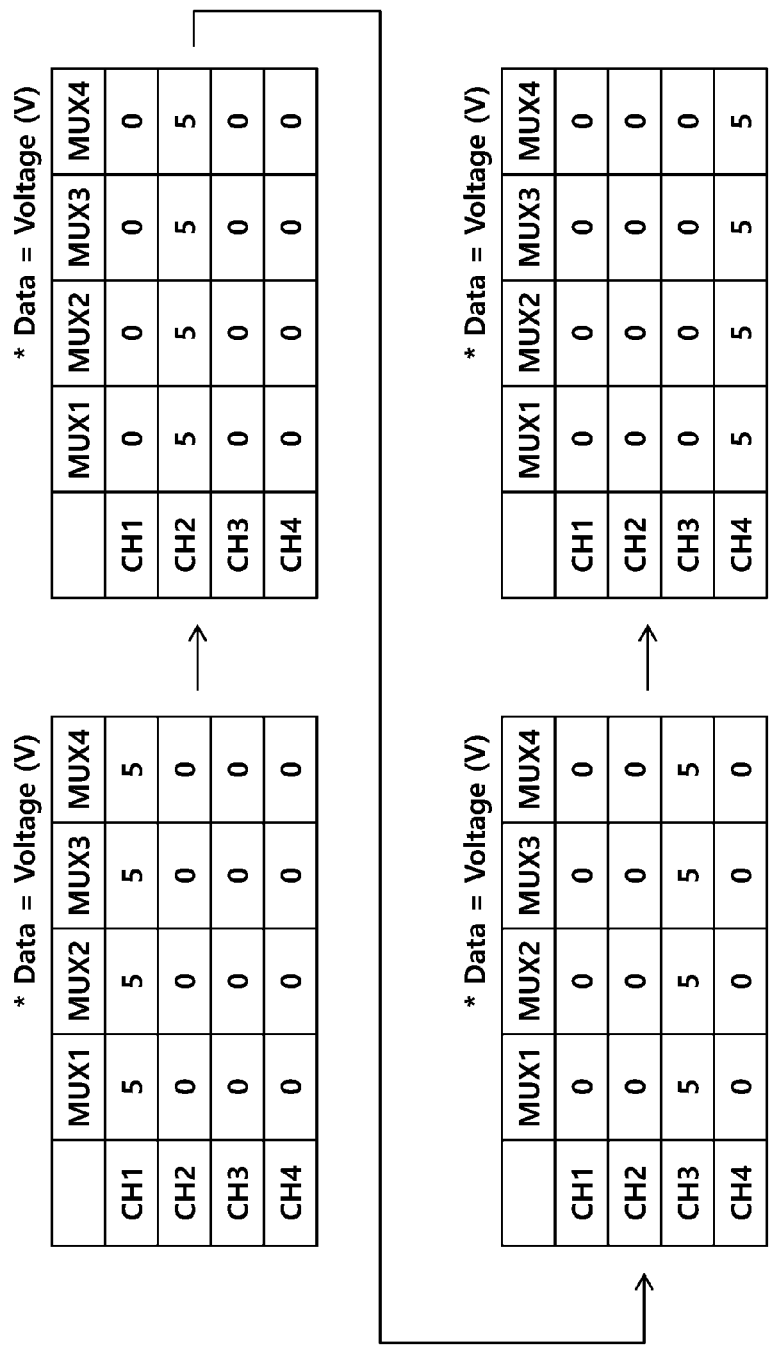
FIG. 9 is a diagram for explaining an example in which a short-circuit failure is sequentially checked for respective rows.

FIG. 9 is a diagram for explaining an example in which a short-circuit failure is sequentially checked for respective rows.

Referring to FIG. 9, in the first short-circuit detection period, the electrode-driving circuit may supply the high voltage (5V) to the electrodes of the first row CH1 and the low voltage (0V) to the electrodes of the remaining rows CH2, CH3, and CH4. In addition, in the second short-circuit detection period, the electrode-driving circuit may supply the high voltage (5V) to the electrodes of the second row CH2 and the low voltage (0V) to the electrodes of the remaining rows CH3, CH4, and CH1. Then, the electrode-driving circuit may check the short-circuit failure of the electrodes arranged in each row by sequentially supplying the high voltage (5V) to the electrodes of the third row CH3 and the fourth row CH4.

The electrode-driving circuit may diagnose the short-circuit failure of the electrodes on a column-by-column basis rather than a row-by-row basis.

FIG. 10 is a diagram for explaining an example in which voltages of different voltage levels are supplied to odd-numbered columns and even-numbered columns, respectively.

Referring to FIG. 10, in the first short-circuit detection period, the electrode-driving circuit may supply a high voltage (5V) to a plurality of electrodes arranged in the odd-numbered columns MUX1 and MUX3 and a low voltage (0V) to a plurality of electrodes arranged in even-numbered columns MUX2 and MUX4. At this time, in order to supply the same voltage for each column, the plurality of auxiliary driving units 716 described above with reference to FIG. 7 may output different voltage levels to the output terminals from column to column.

On the other hand, a voltage (e.g., 2.5V) between the high voltage (5V) and the low voltage (0V) may be formed on short-circuited electrodes (the electrodes of the fourth row CH4 in the example of FIG. 10). The electrode-driving circuit may diagnose a short-circuit failure of the electrodes by sensing such a voltage formed on the electrodes.

The electrode-driving circuit may diagnose a short-circuit failure of the electrodes after converting a voltage formed on the electrodes into a digital value using an analog-to-digital converter and a digital processor. For example, on the electrodes on which no short-circuit failure has occurred, a digital code (e.g., 2048) corresponding to the high voltage may be generated, or a digital code (e.g., 0) corresponding to the low voltage may be generated. On the other hand, a digital code (e.g., 1024) corresponding to a voltage between the high voltage and the low voltage may be generated on the electrodes where a short-circuit failure has occurred. The electrode-driving circuit may diagnose a short-circuit failure of each electrode using the digital code for each electrode.

As illustrated in FIG. 10, although the electrode-driving circuit may simultaneously check even-numbered columns and odd-numbered columns, respective columns may be sequentially checked.

Figure 11:
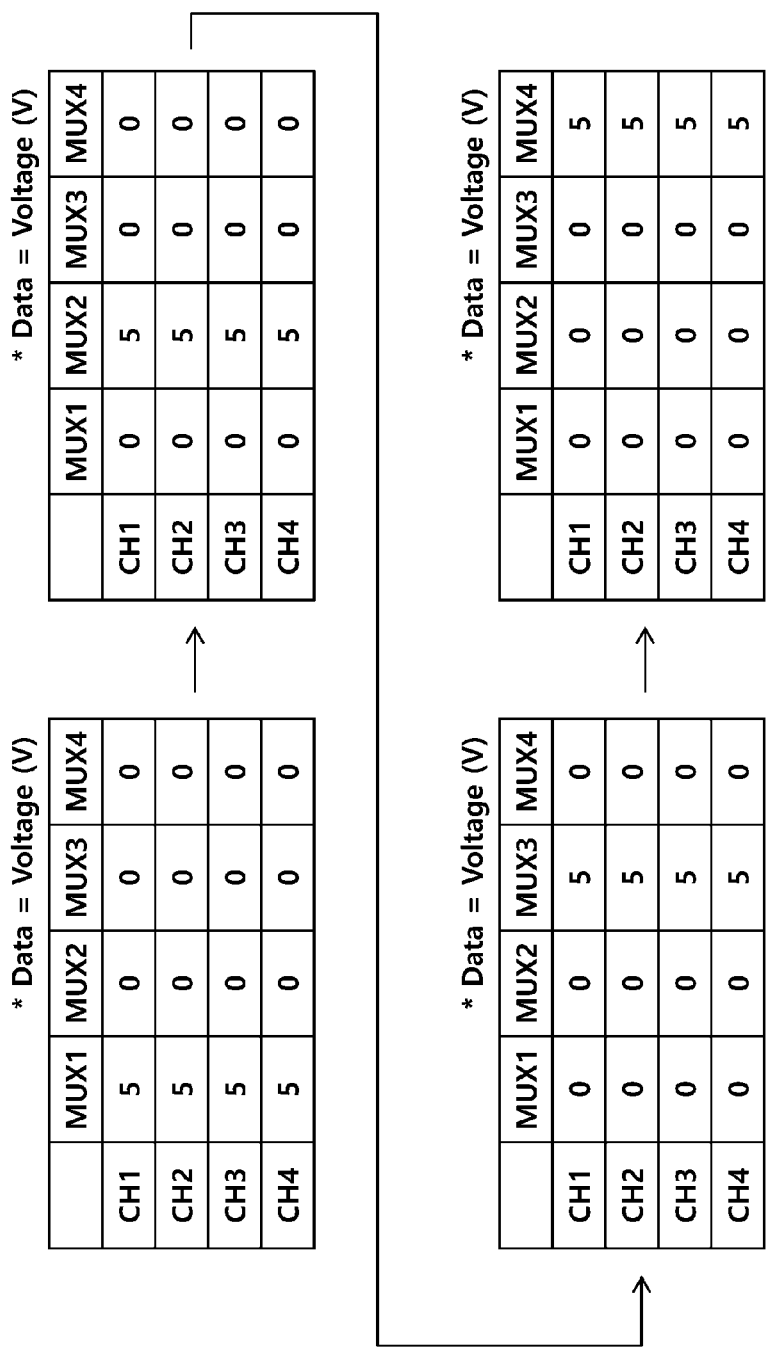
FIG. 11 is a diagram for explaining an example in which a short-circuit failure is sequentially checked for respective columns.

FIG. 11 is a diagram for explaining an example in which a short-circuit failure is sequentially checked for respective columns.

Referring to FIG. 11, in the first short-circuit detection period, the electrode-driving circuit may supply the high voltage (5V) to the electrodes of the first column MUX1 and the low voltage (0V) to the electrodes of the remaining columns MUX2, MUX3, and MUX4. In addition, in the second short-circuit detection period, the electrode-driving circuit may supply the high voltage (5V) to the electrodes of the second column MUX2 and the low voltage (0V) to the electrodes of the remaining columns MUX3, MUX4, and MUX1. Then, the electrode-driving circuit may check the short-circuit failure of the electrodes arranged in each column by sequentially supplying the high voltage (5V) to the electrodes of the third column MUX3 and the fourth column MUX4.

Figure 12:
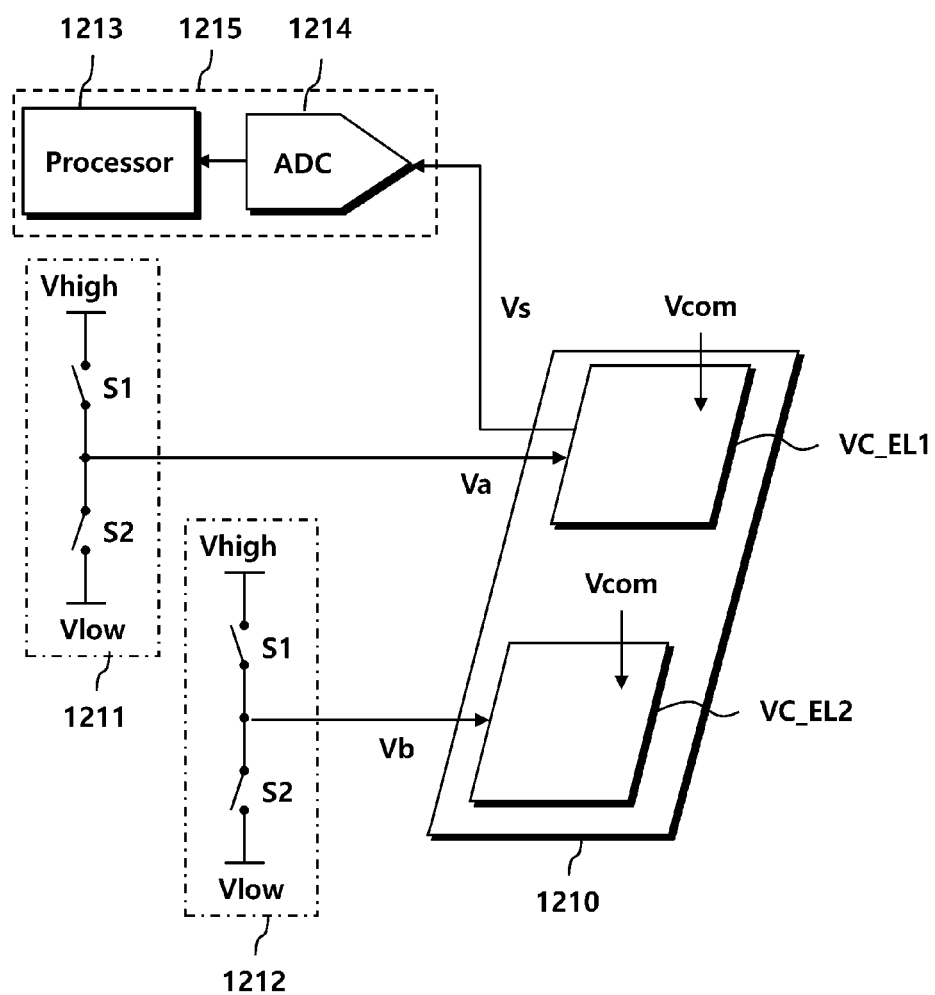
FIG. 12 is a configuration diagram of a display device according to another embodiment.

FIG. 12 is a configuration diagram of a display device according to another embodiment.

Referring to FIG. 12, the display device 1200 may include a panel 1210, a first driving unit 1211, a second driving unit 1212, and a sensing unit 1215.

On the panel 1210, a plurality of pixels may be disposed, and a plurality of common voltage electrodes VC_EL1 and VC_EL2 may be disposed so as to transmit a common voltage VCOM to the pixels.

The first driving unit 1211 may supply a first voltage Va having a first voltage level to a first common voltage electrode VC_EL1. In addition, the second driving unit 1212 may supply a second voltage Vb having a second voltage level, which differs from the first voltage level, to a second common voltage electrode VC_EL2, which is disposed adjacent to the first common voltage electrode VC_EL1 in the panel 1210.

In addition, when the voltage (sensed voltage Vc) formed on the first common voltage electrode VC_EL1 indicates a voltage level between the first voltage level and the second voltage level, the sensing unit 1215 may diagnose that a short-circuit failure has occurred in the first common voltage electrode VC_EL1.

The first driving unit 1211 and the second driving unit 1212 may include a pull-up circuit and a pull-down circuit.

The pull-up circuit may include, for example, a switch S1, one side of which is connected to a high-voltage source Vhigh. In addition, the pull-down circuit may include, for example, a switch S2, one side of which is connected to a low-voltage source Vlow.

At one point of view, the first driving unit 1211 may generate a first voltage Va using the pull-up circuit and the second driving unit 1212 may generate a second voltage Vb using the pull-down circuit. At another point of view, the first driving unit 1211 may generate the second voltage Vb using the pull-down circuit, and the second driving unit 1212 may generate the first voltage Va using the pull-up circuit. In addition, the sensing unit 1215 may diagnose the short-circuit failure of the first common voltage electrode VC_EL1 or the second common voltage electrode VC_EL2 by sensing a voltage formed on the first common voltage electrode VC_EL1 or the second common voltage electrode VC_EL2 at each time point.

The sensing unit 1215 may include an analog-to-digital converter 1214 and a digital processor 1213, and may diagnose a short-circuit failure with respect to the first common voltage electrode VC_EL1 by comparing the sensed value obtained by converting the sensed voltage Vc into a digital value, a first voltage value corresponding to the first voltage level, and a second voltage value corresponding to the second voltage level. At this time, the digital processor 1213 may store the first voltage value corresponding to the first voltage level and the second voltage value corresponding to the second voltage level in advance in a memory, and when the sensed value obtained by converting the sensed voltage Vc into a digital value is received, the digital processor 1213 may diagnose a short-circuit failure with respect to the first common voltage electrode VC_EL1 by comparing the first voltage value, the second value, and the sensed value.

Here, the common voltage electrodes VC_EL1 and VC_EL2 may be one example of the electrodes described above. In other words, the first driving unit 1211, the second driving unit 1212, and the sensing unit 1215 may diagnose the short-circuit failure of the electrodes in the same manner.

Figure 13:
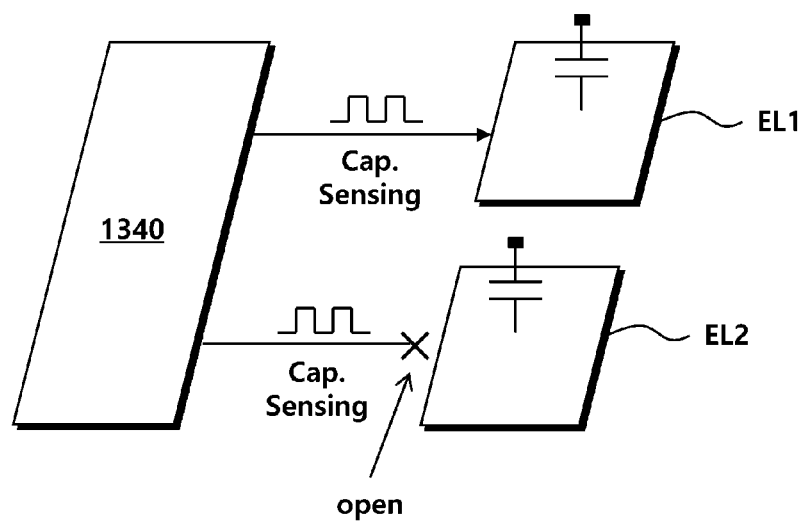
FIG. 13 is a diagram illustrating how an electrode-driving circuit according to still another embodiment diagnoses an open-circuit failure of electrodes.

FIG. 13 is a diagram illustrating how an electrode-driving circuit according to still another embodiment diagnoses an open-circuit failure of electrodes.

Referring to FIG. 13, the electrode-driving circuit 1340 may supply a driving signal to a plurality of electrodes EL1 and EL2 which are disposed on the panel. The electrode-driving circuit 1340 may sense electrostatic capacitance or a change in electrostatic capacitance of the electrodes EL1 and EL2 according to a response signal formed on each of the electrodes EL1 and EL2 in response to the driving signal. In addition, the electrode-driving circuit 1340 may sense a touch or proximity of an external object with respect to the panel using a sensed value.

Further, the electrode-driving circuit 1340 may diagnose an open-circuit failure of a line connected to each electrode using the sensed value. Generally, the electrodes EL1 and EL2 form a capacitance with the peripheral electrodes. The electrode-driving circuit 1340 may obtain a sensed value corresponding to a change in electrostatic capacitance or a change in electrostatic capacitance of the electrodes EL1 and EL2 using a driving signal and a response signal to the driving signal. However, when the line connected to the electrodes EL1 and EL2 is opened, the electrostatic capacitance of the electrodes EL1 and EL2 may be sensed very small. For example, only the parasitic electrostatic capacitance of a line connected to the electrodes EL1 and EL2 may be measured. According to this principle, the electrode-driving circuit 1340 may determine that an open-circuit failure has occurred in the electrodes EL1 and EL2 when the sensed value corresponding to the electrostatic capacitance or a change in electrostatic capacitance of the electrodes EL1 and EL2 is smaller than a set value.

Figure 14:
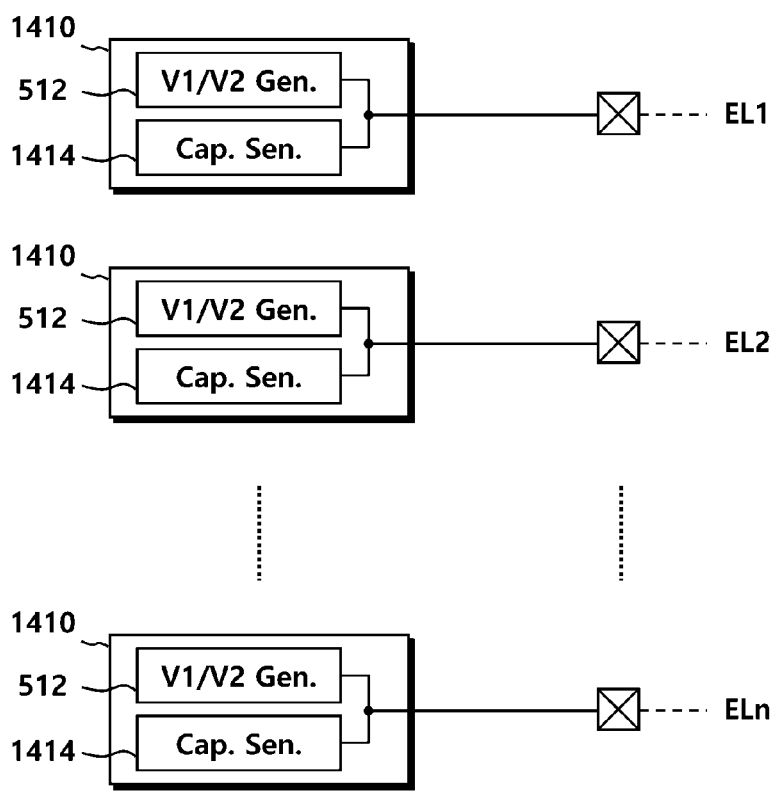
FIG. 14 is an internal configuration diagram of an electrode-driving circuit according to still another embodiment.

FIG. 14 is an internal configuration diagram of an electrode-driving circuit according to still another embodiment.

Referring to FIG. 14, the electrode-driving circuit 1340 may include a plurality of channel circuits 1410. The channel circuits 1410 may diagnose an open-circuit failure of the electrodes EL1, EL2, . . . , and ELn connected to the respective output terminals.

Each channel circuit 1410 may include a driving unit 512 and a sensing unit 1414.

The driving unit 512 may supply a driving signal to the electrodes EL1, EL2, . . . , and ELn disposed on the panel.

In addition, the sensing unit 1414 may sense a touch or proximity of an external object with respect to the panel according to a response signal formed on the electrodes EL1, EL2, . . . , and ELn in response to the driving signal. Then, the sensing unit 1414 may diagnose the open-circuit failure of the line connected to the electrodes EL1, EL2, . . . , and ELn according to the response signal.

Meanwhile, a driving condition of the electrode-driving circuit 1340 may be set in such a manner that when sensing the electrostatic capacitance of the electrodes EL1, EL2, . . . , ELn for a specific purpose, such as touch sensing, the basic electrostatic capacitance is sensed as being small. For example, the electrodes EL1, EL2, . . . , and ELn may form parasitic electrostatic capacitances with peripheral electrodes disposed therearound, and the electrode-driving circuit 1340 may supply an auxiliary driving signal, the phase of which is synchronized with a driving signal, to the peripheral electrodes such that the parasitic electrostatic capacitances are not sensed. When the auxiliary driving signal is supplied to the peripheral electrodes in this way, the overall electrostatic capacitance of the electrodes EL1, EL2, . . . , and ELn is sensed as being small, and thus it may be difficult for the sensing unit 1414 to diagnose an open-circuit failure.

In order to solve this problem, the sensing unit 1414 may generate a first sensed value corresponding to a response signal in a first driving condition in which a driving signal and a synchronized auxiliary driving signal are supplied to peripheral electrodes arranged around the electrodes EL1, EL2, . . . , and ELn. In addition, the sensing unit 1414 may diagnose an open-circuit failure of the electrodes EL1, EL2, . . . , and ELn by generating a second sensed value corresponding to a response signal in a second driving condition in which a constant-voltage signal is supplied to the peripheral electrodes or in which the peripheral electrodes are floated, and comparing the first sensed value and the second sensed value. It is highly likely that an electrode, of which the sensed value corresponding to the electrostatic capacitance is sensed as being small in both of the first driving condition and the second driving condition, is in an open-circuit failure.

Figure 15:
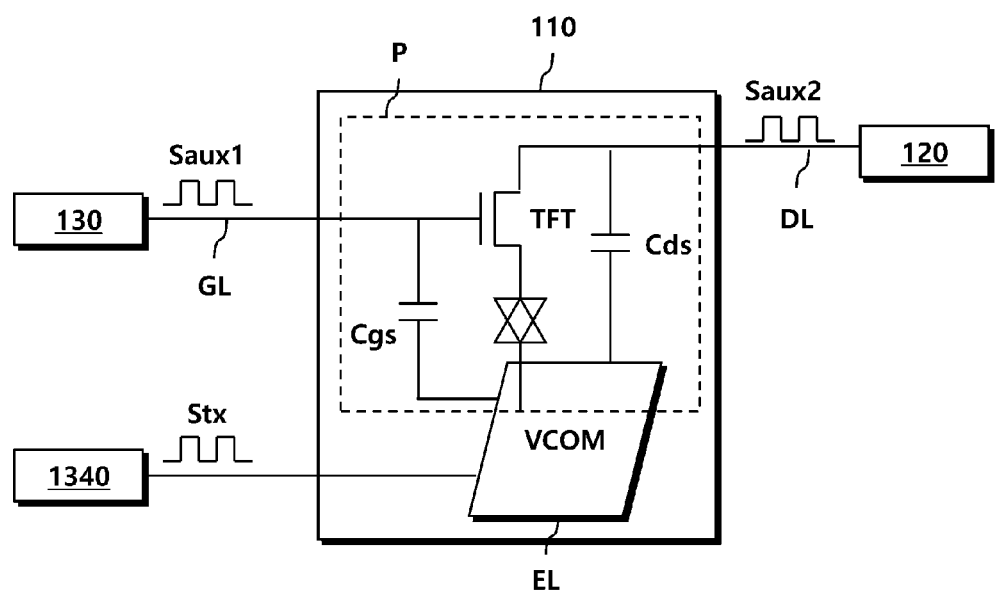
FIG. 15 is a configuration diagram of a display apparatus according to still another embodiment.

FIG. 15 is a configuration diagram of a display apparatus according to still another embodiment.

Referring to FIG. 15, a display device 1500 may include a panel 110, a data-driving circuit 120, a gate-driving circuit 130, and an electrode-driving circuit 1340.

The gate-driving circuit 130 may supply a scan signal to a gate line GL in a display-driving period. In addition, the gate-driving circuit 130 may input a first auxiliary driving signal Saux1, the phase of which is synchronized with a driving signal, to the gate line GL connected to a pixel P in the panel 110 at a time point other than the display-driving period (e.g., a touch-driving period or an open-circuit detection period).

The data-driving circuit 120 may supply a data voltage to a data line DL in the display-driving period. In addition, the data-driving circuit 120 may input a second auxiliary driving signal Saux2, the phase of which is synchronized with a driving signal, to the data line DL connected to a pixel Pin the panel 110 at a time point other than the display-driving period (e.g., the touch-driving period or the open-circuit detection period).

In the first driving condition, in which the first auxiliary driving signal Saux1 and the second auxiliary driving signal Saux2 are supplied, the electrode-driving circuit 1340 (e.g., the sensing unit) may generate a first sensed value corresponding to the response signal.

In addition, in the second driving condition in which a constant-voltage signal is supplied to the gate line GL and the data line DL, the electrode-driving circuit 1340 (e.g., the sensing unit) may generate a second sensed value corresponding to the response signal.

The electrode-driving circuit 1340 may set a base value in touch sensing, and may generate a sensed value for the response signal based on the base value. The base value is a value generated according to a response signal received at each electrode EL of the panel 110 basically in a state where an external object does not touch or approach the panel 110. It is important to set the base value appropriately because there is a certain restriction on the range of values that the configurations included in the electrode-driving circuit 1340 can process (e.g., the number of bits of variables).

Meanwhile, the electrode-driving circuit 1340 (e.g., the sensing unit) may set a base value for the conversion of the response signal using the first sensed value generated in the first driving condition.

In addition, the electrode-driving circuit 1340 (e.g., the sensing unit) may generate a second sensed value corresponding to the response signal based on the base value for each electrode EL in the second driving condition. In addition, the electrode-driving circuit 1340 (e.g., the sensing unit) may diagnose the open-circuit failure of a line connected to the electrodes EL by comparing the second sensed values of the electrodes EL.

For example, after the base value is set, when the response signal of each electrode EL is converted into a sensed value in the second driving condition and thus a sensed value is generated, the sensed value of a normal electrode EL is high because a constant-voltage signal is supplied to peripheral electrodes (e.g., a gate line GL and a data line DL) (the sensed values of the electrodes are high because the sensed value of the normal electrodes EL is sensed high). In contrast, even in the second driving condition, in an electrode EL in which an open-circuit failure has occurred, the sensed value generated by converting the response signal may remain at the level of the base value (in other words, the sensed value may be low). According to this principle, in the second driving condition, the electrode-driving circuit 1340 compares the sensed values of all of the electrodes EL with each other, and may diagnose an electrode, the sensed value of which is relatively low, as an electrode in the open-circuit failure state.

FIG. 16 is a diagram representing sensed values in a first driving condition and a second driving condition in still another embodiment.

In FIG. 16, upper data DATA_A is a base value of each electrode generated using a value sensed under the first driving condition. The base value may be set to the lowest of the available values (e.g., 0), but it may be set to an intermediate value (e.g., 1024) as illustrated in FIG. 16.

In FIG. 16, lower data DATA_B is a sensed value generated corresponding to the response signal based on the base value under the second driving condition. Referring to the lower data DATA_B of FIG. 16, the sensed value of an electrode connected to the third output terminal MUX3 of the channel 2 CH2 is 1024, and the sensed value of another electrode is 2048. In this example, the electrode-driving circuit may diagnose an electrode, which differs from the other electrodes by a predetermined value or more in terms of the sensed value, as being in an open-circuit failure state under the second driving condition.

The sensed value may be relatively small or large upon open-circuit failure. This may vary depending on the sensing method. For example, in a self-electrostatic capacitance touch type, when a touch or proximity of an external object with respect to a panel occurs, a response signal is formed by increase of the electrostatic capacitance formed on an electrode, and when an open-circuit failure occurs in a line connected to an electrode, a response signal is formed by decrease of the electrostatic capacitance formed on the electrode.

Figure 17:
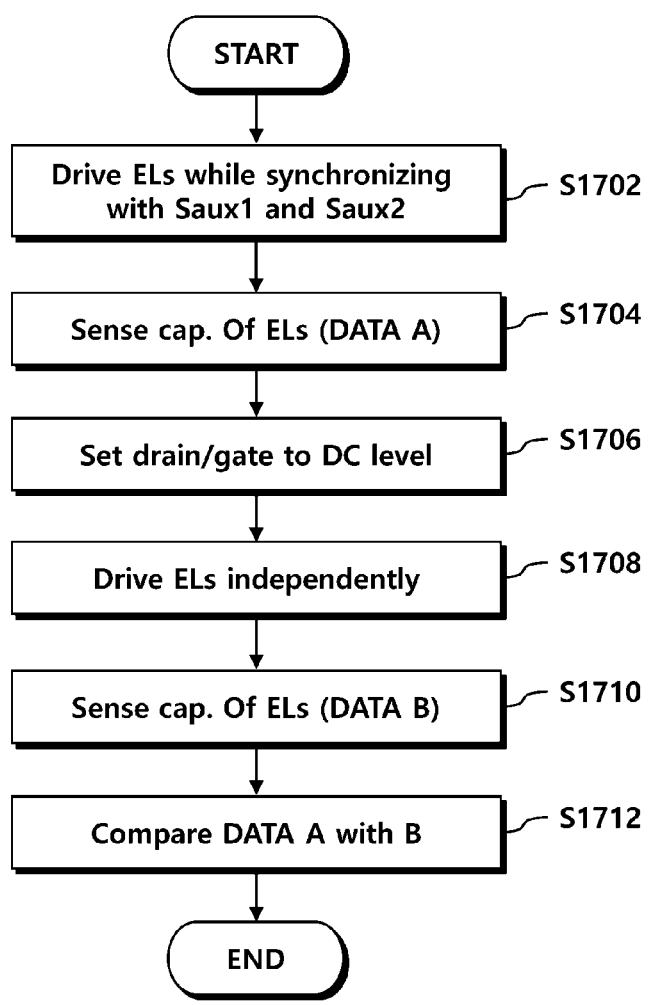
FIG. 17 is a flowchart of an electrode-driving method according to still another embodiment.

FIG. 17 is a flowchart of an electrode-driving method according to still another embodiment.

Referring to FIG. 17, the gate-driving circuit supplies a first auxiliary driving signal, the phase of which is synchronized with the driving signal, to a gate line, and the data-driving circuit supplies a second auxiliary driving signal, the phase of which is synchronized with the driving signal, to a data line. Then, the electrode-driving circuit may supply a driving signal to the electrodes (S1702).

Then, the electrode-driving circuit may generate a first sensed value corresponding to the electrostatic capacitance of each electrode under a driving condition (first driving condition) of S1702 (S1704).

Then, the gate-driving circuit may supply a constant-voltage signal to a gate line, and the data-driving circuit may supply a constant-voltage signal to a data line (S1706).

Then, the electrode-driving circuit may supply a driving signal, which is not synchronized with (independent from) the signals, which are supplied to the gate line and the data line by the gate-driving circuit and the data-driving circuit, to the electrodes (S1708).

Then, the electrode-driving circuit may generate a second sensed value corresponding to the electrostatic capacitance of each electrode under a driving condition (second driving condition) of S1708 (S1710).

Then, the electrode-driving circuit may diagnose an open-circuit failure of each electrode by comparing the first sensed value and the second sensed value, or may diagnose an open-circuit failure of each electrode by comparing the second sensed values with respect to a plurality of electrodes (S1712).

According to the embodiments described above, it is possible to detect a short-circuit failure of electrodes disposed on a panel. According to the embodiments, it is possible to detect an open-circuit failure of electrodes disposed on a panel. According to the embodiments, it is possible to detect both a short-circuit failure and an open-circuit failure of electrodes disposed on a panel. Further, according to the embodiments, it is possible to detect a short-circuit failure or an open-circuit failure of electrodes disposed on a panel using a touch-sensing circuit.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A panel-driving device comprising:
a plurality of channel circuits each including a driving unit configured to supply a common voltage to an electrode in a display-driving period and to supply a driving signal, which varies at a plurality of voltage levels, to the electrode in a touch-driving period, and a sensing unit configured to sense a touch or proximity of an external object to a panel according to a response signal formed on the electrode in response to the driving signal,
wherein a driving unit included in a first channel circuit supplies a first voltage having a first voltage level among the plurality of voltage levels to a first electrode,
a driving unit included in a second channel circuit supplies a second voltage having a second voltage level, which differs from the first voltage level, among the plurality of voltage levels to a second electrode disposed adjacent to the first electrode, and
a sensing unit included in the first channel circuit diagnoses a short-circuit failure of the first electrode according to a voltage level of a sensed voltage formed on the first electrode.

2. The panel-driving device of claim 1, wherein the sensing unit included in the first channel circuit determines that the short-circuit failure has occurred in the first electrode when the sensed voltage indicates a voltage level between the first voltage level and the second voltage level.

3. The panel-driving device of claim 1, wherein the channel circuit further comprises a mux unit configured to selectively output the driving signal to at least one of a plurality of output terminals.

4. The panel-driving device of claim 3, wherein the mux unit includes a plurality of auxiliary driving units connected to respective output terminals,
the driving unit supplies the first voltage to a third electrode through a first output terminal,
an auxiliary driving unit connected to a second output terminal supplies a third voltage having a third voltage level to a fourth electrode, and
the sensing unit diagnoses a short-circuit failure between the third electrode and the fourth electrode according to a voltage formed on the third electrode.

5. The panel-driving device of claim 4, wherein the driving unit includes a first switch configured to electrically connect a high-voltage source and a first node to each other and a second switch configured to electrically connect a low-voltage source and the first node to each other, and
the plurality of auxiliary driving units each includes a third switch configured to electrically connect the first node and an output terminal, a fourth switch configured to electrically connect the high-voltage source and the output terminal to each other, and a fifth switch configured to electrically connect the low-voltage source and the output terminal to each other.

6. The panel-driving device of claim 1, wherein the first voltage is supplied to a plurality of first electrodes arranged in a first column,
the second voltage is supplied to a plurality of second electrodes arranged in a second column, and
a short-circuit failure between the plurality of first electrodes and the plurality of second electrodes is diagnosed according to the sensed voltage formed in the plurality of first electrodes arranged in the first column.

7. The panel-driving device of claim 1, wherein the sensing unit generates a sensed value corresponding to an electrostatic capacitance of the electrode according to the response signal, and diagnoses an open-circuit failure of a line electrically connected to the electrode according to the sensed value.

8. The panel-driving device of claim 1, wherein the sensing unit in the first channel circuit determines that a short-circuit failure has occurred in the first electrode when the sensed voltage is different from the first voltage level by a predetermined voltage or more.

9. A display device comprising:
a panel including a plurality of pixels disposed thereon and a plurality of common voltage electrodes configured to transmit a common voltage to the pixels;
a first driving unit configured to supply a first voltage having a first voltage level to a common voltage electrode;
a second driving unit configured to supply a second voltage having a second voltage level, which differs from the first voltage level, to the common voltage electrode; and
a sensing unit configured to:
sense a touch or proximity of an external object to the panel according to a response signal formed on the common voltage electrode in a touch-sensing period in which the first voltage and the second voltage are alternately supplied; and
in a time period in which the first voltage is supplied to a first common voltage electrode and the second voltage is supplied to a second common voltage electrode adjacent to the first common voltage electrode, determine that a short-circuit failure has occurred in the first common voltage electrode when a voltage (a sensed voltage) formed in the first common voltage electrode indicates a voltage level between the first voltage level and the second voltage level.

10. The display device of claim 9, wherein the first driving unit and the second driving unit include a pull-up circuit and a pull-down circuit, and
the first driving unit generates the first voltage using the pull-up circuit, and the second driving unit generates the second voltage using the pull-down circuit, or
the first driving unit generates the second voltage using the pull-down circuit, and the second driving unit generates the first voltage using the pull-up circuit.

11. The display device of claim 9, wherein the sensing unit includes an analog-to-digital converter, and is configured to diagnose a short-circuit failure with respect to the first common voltage electrode by comparing a sensed value obtained by converting the sensed voltage into a digital value, a first voltage value corresponding to the first voltage level, and a second voltage value corresponding to the second voltage level.

12. A panel-driving device comprising:
   a driving unit configured to supply a driving signal to an electrode disposed on a panel; and
   a sensing unit configured to:
      sense a touch or proximity of an external object with respect to the panel according to a response signal formed on the electrode in response to the driving signal, and to diagnose an open-circuit failure of a line connected to the electrode according to the response signal;
      generate a first sensed value corresponding to the response signal under a first driving condition where an auxiliary driving signal, a phase of which is synchronized with the driving signal, is supplied to a peripheral electrode arranged around the electrode; and
      generate a second sensed value corresponding to the response signal under a second driving condition where a constant-voltage signal is supplied to the peripheral electrode or the peripheral electrode is floated;
      wherein the open-circuit failure of the line connected to the electrode is diagnosed by comparing the first sensed value and the second sensed value.

13. The display device of claim 12, further comprising:
   a gate-driving circuit configured to input a first auxiliary driving signal, a phase of which is synchronized with the driving signal, to a gate line connected to a pixel in the panel; and
   a data-driving circuit configured to input a second auxiliary driving signal, a phase of which is synchronized with the driving signal, to a data line connected to the pixel,
   wherein the sensing unit is configured to:
      set a base value for conversion of the response signal under a first driving condition where the first auxiliary driving signal and the second auxiliary driving signal are supplied;
      generate a sensed value corresponding to the response signal based on the base value with respect to the electrode under a second driving condition where a constant-voltage signal is supplied to the gate line and the data line; and
      diagnose an open-circuit failure of a line connected to the electrode by comparing the sensed value with respect to the electrode.

14. A panel-driving device comprising:
   a driving unit configured to supply a driving signal to an electrode disposed on a panel; and
   a sensing unit configured to sense a touch or proximity of an external object with respect to the panel according to a response signal formed on the electrode in response to the driving signal, and to diagnose an open-circuit failure of a line connected to the electrode according to the response signal;
   wherein, when the touch or proximity of the external object with respect to the panel occurs, the response signal is formed by increase of an electrostatic capacitance formed on the electrode, and
   when the open-circuit failure occurs in the line connected to the electrode, the response signal is formed by a decrease of the electrostatic capacitance formed on the electrode.

* * * * *